June 27, 1933.   A. C. PARKER   1,915,836
AUTOMATIC GLASS BLOWING MACHINE
Filed Oct. 24, 1928    4 Sheets-Sheet 1
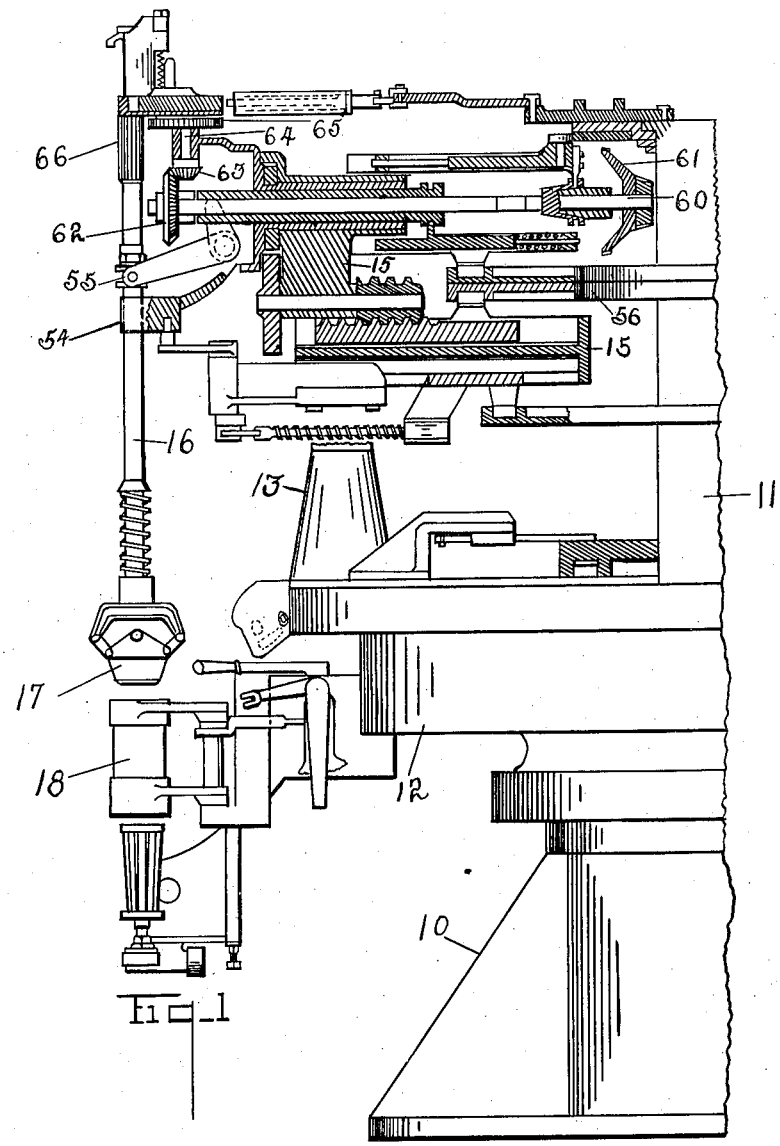
Inventor
Alvah C. Parker
By Owen & Owen
Attorney

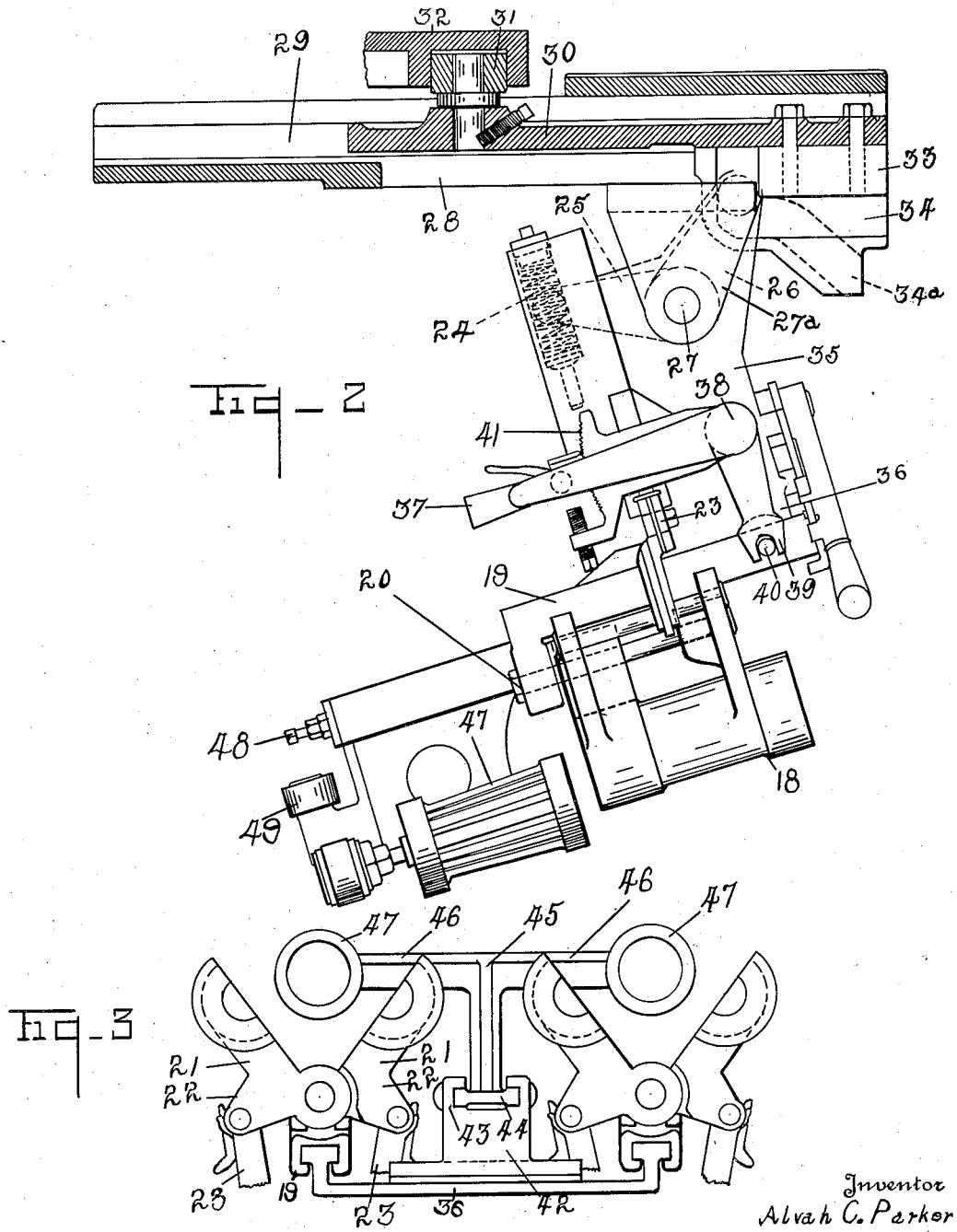

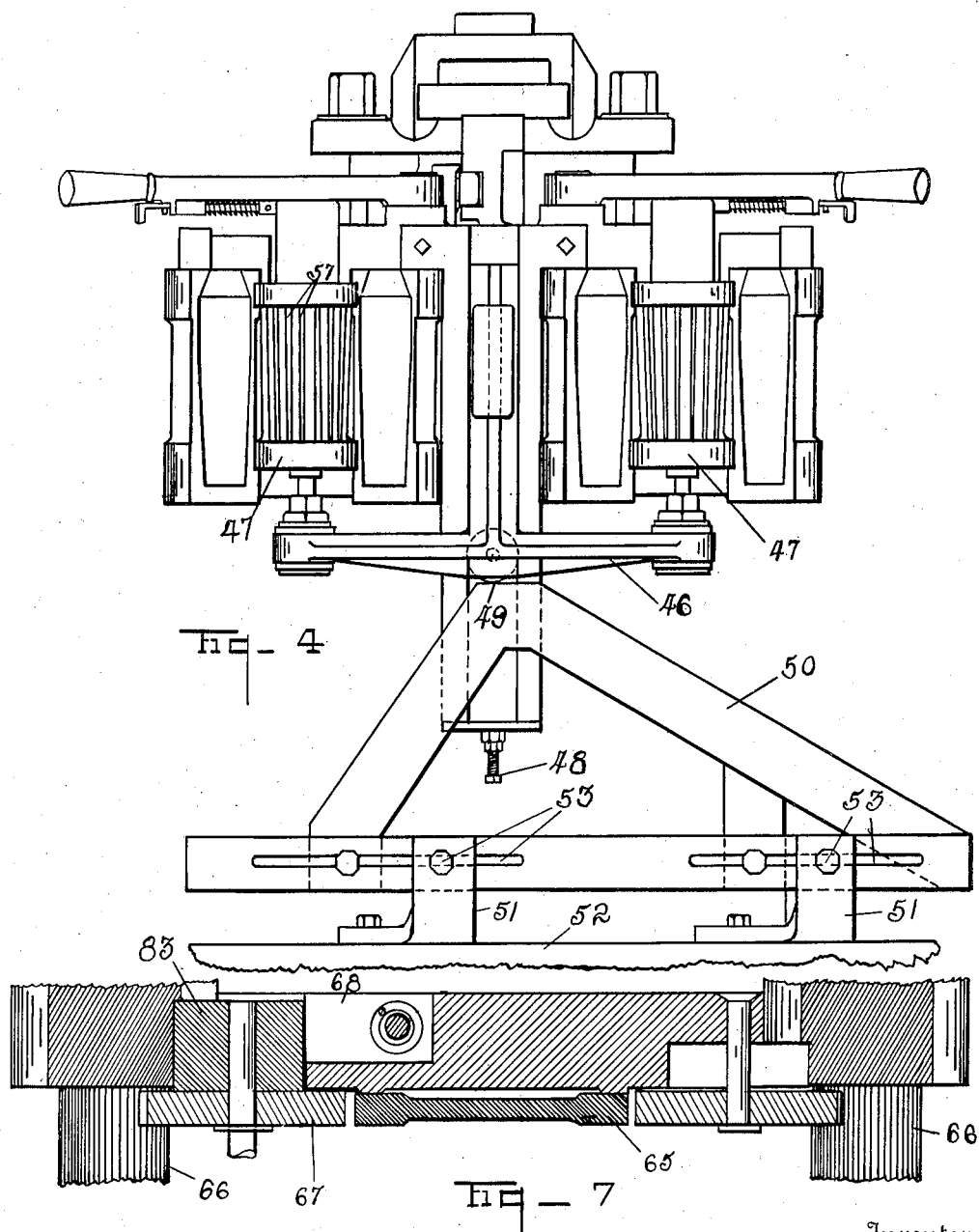

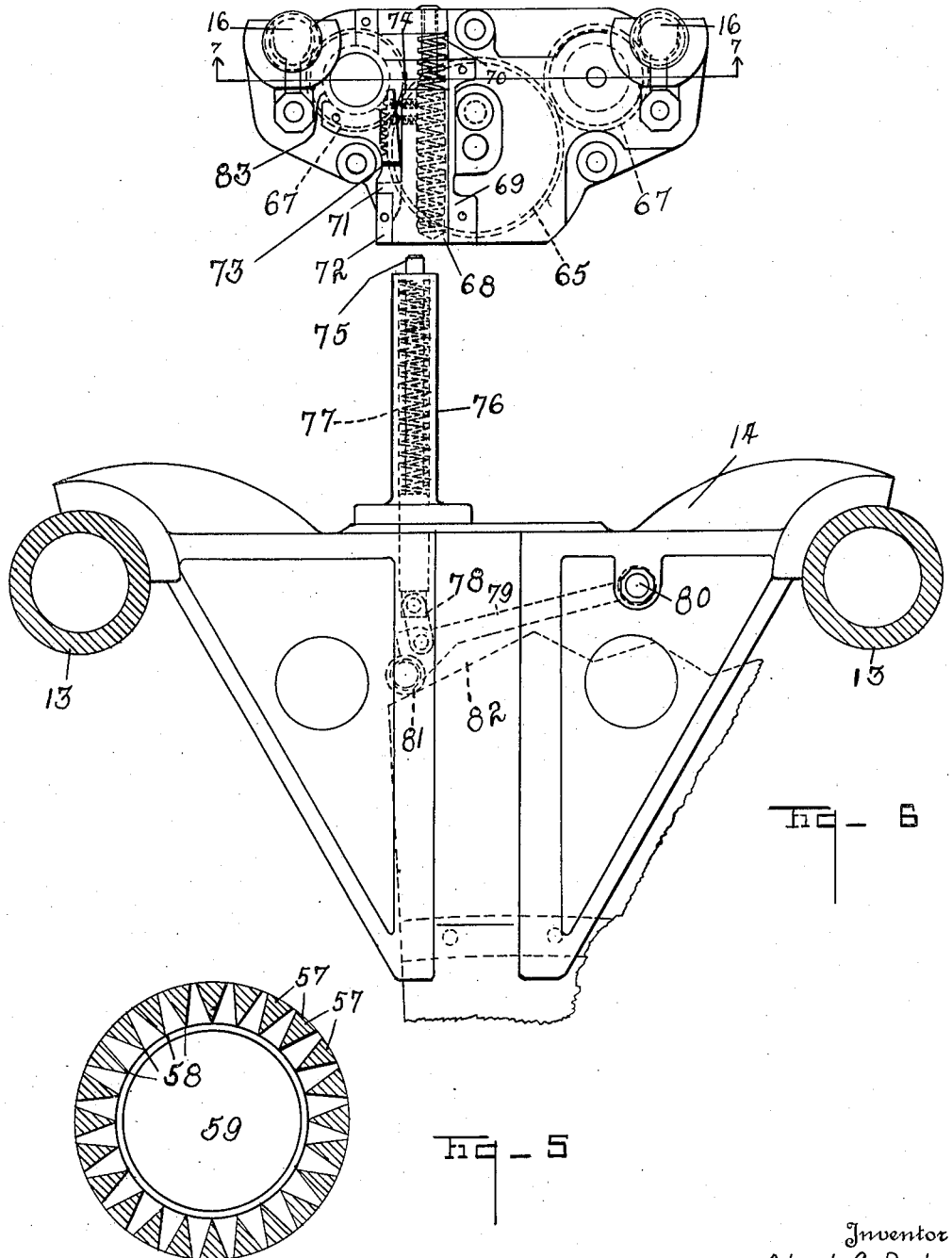

Patented June 27, 1933

1,915,836

UNITED STATES PATENT OFFICE

ALVAH C. PARKER, OF TOLEDO, OHIO, ASSIGNOR TO THE LIBBEY GLASS MANUFACTURING COMPANY, A CORPORATION OF OHIO

AUTOMATIC GLASS BLOWING MACHINE

Application filed October 24, 1928. Serial No. 314,557.

This invention relates to automatic apparatus for blowing glassware and more particularly to apparatus for blowing what are commonly known as "optics", that is, glassware having designs therein resulting from chilling the blank along certain lines before blowing by means of what is known as a "spot mold", which is a device having a sharp raised interior design, and adapted to contact glass only on the raised points or lines of said design.

My invention is illustrated as being used in conjunction with a glass blowing machine similar to that shown in the patent to August Kadow, No. 1,331,772 issued February 24, 1920. Details of the invention will appear as the description proceeds.

In the accompanying drawings forming a part of this specification, Figure 1 is a partial section of apparatus such as shown in the above specified patent with my invention applied thereto; Fig. 2 is an enlarged detail showing a side elevation of the molding apparatus in its lowered position; Fig. 3 is a plan view of the mold and mold carrier; Fig. 4 is a front elevation of the molds with the spot mold in elevated position; Fig. 5 is a horizontal section of one of the spot molds; Fig. 6 is a plan view of the apparatus for oscillating the spindles; Fig. 7 is a section on the line 7—7 of Fig. 6.

The apparatus illustrated comprises a base 10 from which rises a central drum 11. The turret is adapted to revolve around drum 11 and to carry a plurality of blowing devices for successive operation. There is indicated a base 12 for this turret with columns 13 rising from the base to an upper plate 14 mounted between the columns. Other castings 15 are mounted between the columns to provide the slideways and supports for the various devices comprising the operating portion of the machine.

A spindle 16 carried by the turret has an end clamp 17 adapted to clamp and hold a gob of glass. Beneath each spindle 16 there is a mold 18. A mold carrier 19 has mounted thereon a hinge pin 20 from which the mold halves are supported by arms 21. Lugs 22 projecting from arms 21 are connected by links 23 with a mold operating device including a cushioning spring 24. This mold operating device is actuated by an arm 25 of a lever which is fulcrumed on a pin 27 mounted in brackets 27ª depending from base 12. The other arm 26 of the lever is operated by a cam.

Base 12 is provided with a radial slot 28 and a slideway 29 in which there operates a slide 30. Slide 30 is provided with a cam roller 31 operated by a fixed cam 32 mounted upon the central drum. A cam member 33 is mounted on slide 30 and projects downward through slot 28. Cam 33 is provided with a cam groove 34ª for actuating the opening and closing arm 26, and with a cam groove 34 which operates a support 35 pivoted upon shaft 27 and having a projecting portion 36 upon which mold carriers 19 are mounted.

In the construction shown, there is a pair of mold carriers 19, each slidable vertically on member 36. A lever 37 fulcrumed at 38 has a forked arm 39 enclosing a pin 40 on carrier 19 and is held in adjusted position by a ratchet member 41 so as to support carrier 19 at the desired elevation upon member 36.

Extending from member 36 between the two molds there is a bracket 42 provided with a slideway 43 in which there is mounted a slide 44. Slide 44 carries a member 45 having arms 46 which support spot molds 47. A set screw 48 limits the downward movement of slide 44 in slideway 43. A cam roller 49 is provided on the lower side of slide 44 and is adapted to engage and be raised by a cam 50 at frequent intervals, as will be more fully described below. Brackets 51 are mounted upon a suitable support 52, which may be the floor upon which the machine rests. Cam 50 is mounted upon brackets 51 by means of an adjustable connection 53 which allows of the adjustment of the cam in the direction of travel of the molding mechanism.

Two spindles 16 are mounted in a carrier 54 above each mold carrier 19. Mechanism 55 is provided for moving the spindles longitudinally and a cam plate 56 mounted upon the central drum operates mechanism 55 and also through intermediate connections oscillates the spindle carrier 54 about a transverse axis radiating from the center of the drum.

The spot mold may be of proper construction to impart the desired design to a glass blank. In the construction shown the spot mold comprises a series of rods 57 each having V-shaped sides 58 adapted to contact the glass and form grooves therein. A block of wood 59 is preferably placed in the bottom of the spot mold to limit the length of the glass blank at the time the spot mold is in operative position.

Spindle carrier 54 is adapted to be rotated by a shaft 60. The shaft 60 may be rotated by any desired connections with means mounted upon the drum. In the construction shown there is a gear wheel 61 which is adapted to mesh with a rack or racks mounted upon the drum in such relation as to rotate shaft 60 at desired times.

The outer end of shaft 60 carries a gear 62 meshing with a small gear 63 on stub shaft 64. The upper end of stub shaft 64 carries a gear 65. Each spindle 16 carries an elongated gear 66 which is always in mesh with an intermediate gear 67 which in turn meshes with gear 65. The elongation of gear 66 allows for its constant meshing with gear 67 regardless of the operation of spindle moving means 55.

A sliding rack carrier 68 is mounted in a slideway 69 above gear 65 on the spindle carrier. A spring 70 normally urges carrier 68 towards the drum until a bolt 71 on the rack carrier encounters a stop 72 on the spindle carrier. A rack 73 is pivoted to the rack carrier 68 and spring 74 between rack 73 and carrier 68 normally urging the rack away from the carrier.

A plunger rod 75 is mounted in a casing 76 upon plate 14 in position to align with rack carrier 68 when the spindles are positioned with their gob carrying ends downward. A spring 77 within the casing 76 normally retracts plunger 75 towards the axis of the drum. A link 78 connects the end of plunger 75 with a lever 79 pivoted to plate 14 at 80. Lever 79 is actuated by a cam roller 81 in position to encounter a cam 82 fixed upon the central drum. When the plunger is urged outward by cam 82, it encounters rack carrier 68 and forces the carrier outward until rack 73 engages and turns a gear 83 mounted upon the upper side of one of the gears 67. When cam 82 allows plunger 75 to return towards the drum, spring 70 forces rack carrier 68 to follow the movement of the plunger and oscillate gear 83 in the opposite direction. Pivoted rack 73 may yield sufficiently to prevent breakage when the teeth of the rack do not at first properly mesh with the teeth of gear 83, or to slip over the teeth in case the spindle does not turn.

The operation of the apparatus will be apparent from an examination thereof in the light of the above disclosure, but for convenience, a brief summary of this operation will be given. The general operation of the glass blowing machines constructed in accordance with the above mentioned patent and other patents of August Kadow is well known and need not be described in detail. For purposes of this application, the essential feature is that spindle 16 is moved about its transverse axis, which is the axis of shaft 60, and is positioned with the gob holding clamp 17 upward to receive the gob and is provided with means for blowing into the gob at proper intervals. In the ordinary operation of the machine, the gob is partially blown into a parison and the spindle is then turned about its transverse axis to position the gob holding end downward.

While the glass is being received and initially blown, the mold and mold carrier associated with the spindle are dropped to the position in which they are shown in Fig. 2. The molds may be sprayed while in that position to keep them at a suitable temperature. After the spindle is positioned with its gob carrying end downward, the mold carrier is raised to the position in which it is shown in Fig. 1. When first raised, the molds 18 are open and so are between the glass and the axis of drum 11. When the parison has become properly elongated, the cam roller on carrier 45 encounters cam 50 and rides upward thereon lifting spot molds 47 into engagement with the parison and impressing a pattern thereon. With the form of device shown this pattern consists in vertical lines and is impressed upon the parison while spindle 16 is stationary with respect to its longitudinal axis. If desired, the rods 57 of the spot mold may be made spiral and cam 82 may be constructed so as to oscillate the spindle about its longitudinal axis in one direction while the spot mold is being raised and in the opposite direction while the spot mold is being lowered. The pitch of the cam being regulated so that the parison will in effect be screwed down into the spot mold and then screwed out therefrom. The block of wood in the bottom of the spot mold acts to support the bottom of the parison and regulate its length at the time the spot mold is raised to its highest position.

After the spot mold has been lowered, the blow molds are closed about the parison and it is blown in the usual manner except for the turning of the spindle about its longitudinal axis. It has been customary to rotate the spindle continuously in one direction as is usual in blowing glass articles in paste molds. When the method herein described is employed for blowing what are known in the trade as "optics", it is preferable to oscillate the glass in the mold instead of continuously rotating it in one direction, at least during the more plastic stage of the glass, in order to avoid distortion of the pattern. For this reason, cam 82 is so arranged as to encounter roll 81 and drive plunger 75 outward and then release it for return movement during, at least, the initial portion of the final blowing. This results in a reciprocating motion of rack carrier 68 which in turn imparts oscillating motion to a gear 83 by means of rack 73. The oscillatory motion of gear 83 is transmitted by the intermediate gear 67 to which it is attached directly to one of the spindle gears 66 and through a gear 65 and the other gear 67 to the companion spindle gear 66. The turning of gear 65 results also in the oscillation of gears 62, 63 and shaft 60. In order to make this possible it is necessary that the oscillatory motion imparted by cam 82 shall take place at a time when a gear 61 on shaft 60 is not engaged by a rack on drum 11.

The oscillatory motion imparted by cam 82 may be continued until the blowing is completed, or it may be continued only during the initial portion of the blowing, or until the glass has cooled sufficiently to retain its pattern. During the final blowing the spindle may be rotated by engagement of gear 61 with a rack on drum 11, as is customary in the machines of this type. In the appended claims, the term "spot mold" is used to define a mold having an interior raised sharp design adapted to contact glass only along the lines of said design, and operating to chill the glass along said lines sufficiently to form along such lines thickened glass walls, upon subsequent blowing of the glass, a result known in the trade as "optics".

What I claim is:

1. A carrier for a gob of glass, means to move the carrier, a spot mold, means to bring the spot mold into engagement with a gob of glass on the carrier while the carrier is in motion and to thereafter move the spot mold from the glass, a blow mold and means to close the blow mold about the gob on the carrier after the spot mold has been removed.

2. A carrier for a gob of glass, means to blow into a gob of glass carried on the carrier, means to move the carrier, a spot mold, means to bring the spot mold into engagement with a gob of glass on the carrier while the carrier is in motion and to thereafter remove the spot mold from the glass, a blow mold and means to close the blow mold about the gob on the carrier after the spot mold has been removed.

3. A carrier for a glass blank, a mold carrier, means to move the mold carrier to and from a position in which it holds the mold in cooperative relation with a blank on the blank carrier, a pattern forming device carried by the mold carrier, means to open and close a mold on the carrier and means to move the pattern forming device on the carrier, the last said means being coordinated with the means to move the mold carrier and the means to open and close a mold on the carrier so that the pattern forming device is moved into cooperative position with a blank and away from that position while the mold carrier is in said cooperative position and while the mold is open.

4. In combination, a spindle adapted to carry a gob of glass, means to impress on the gob carried by the spindle lines approximately longitudinal of the axis of the spindle, a mold, means for closing the mold about a gob on the spindle, means for blowing the glass in the mold, and means to oscillate the spindle about its longitudinal axis while the glass is being blown.

5. In combination, a spindle adapted to carry a gob of glass, means to impress on the gob carried by the spindle lines approximately longitudinal of the axis of the spindle, a mold, means for closing the mold about a gob on the spindle, means for blowing the glass in the mold, and means to oscillate the spindle about its longitudinal axis during the first part of the blowing and means to rotate the spindle during the completion of the blowing.

6. A spindle adapted to carry a gob of glass, means to blow the gob on the spindle, a spot mold, means to apply the spot mold to the gob on the spindle and to remove it therefrom, a blow mold, and means to close the blow mold about the gob on the spindle after the spot mold has been removed.

7. A spindle adapted to carry a gob of glass, means to blow the gob on the spindle, a spot mold and means to apply the spot mold to the gob on the spindle, a blow mold and means to close the blow mold about the gob on the spindle and means to oscillate the spindle about its longitudinal axis during the initial portion of the blowing.

8. A spindle adapted to carry a gob of glass, means to blow the gob on the spindle, a spot mold and means to apply the spot mold to the gob on the spindle, a blow mold and means to close the blow mold about the gob on the spindle and means to oscillate the spindle about its longitudinal axis during the initial portion of the blowing, and means to rotate the spindle subsequent to said oscillation.

9. A spindle adapted to carry a gob of glass, means to blow the gob on the spindle, a spot mold, means to apply the spot mold to the gob on the spindle and to remove it therefrom, a blow mold, means to close the blow mold about the gob on the spindle after the spot mold has been removed and means to revolve said spindle, spot mold and blow mold about a vertical axis.

10. Apparatus in accordance with claim 9, and having means for moving the spindle about a transverse axis.

11. In combination, a central drum, a glass-carrying spindle, means to revolve the spindle about the drum with its longitudinal axis in a plane substantially parallel to the axis of the drum, means to move the spindle about a transverse axis substantially radial to the drum, a spot mold and a blow mold, and means to carry said molds with the spindle about said drum.

12. In combination, a central drum, a glass-carrying spindle, a carrier supporting said spindle and mounted revolubly about the drum, a blow mold mounted on the carrier beneath the spindle, means to open and close the blow mold, a spot mold mounted on the carrier beneath the spindle and means to reciprocate the spot mold vertically to and from the position occupied by the blow mold when closed.

13. In combination, a central drum, a carrier mounted to rotate about said drum, a glass-carrying spindle mounted on said carrier, a mold support pivoted to the carrier beneath the spindle on a horizontal axis, a blow mold comprising two half molds hinged together about a vertical hinge pin mounted on the mold support, a slide mounted on the mold support for reciprocation parallel with the hinge pin and a spot mold mounted on said slide.

14. In combination, a central drum, a glass-carrying spindle, means to revolve the spindle about the drum with its longitudinal axis in a plane substantially parallel with the axis of the drum, means to move the spindle about a transverse axis substantially radial of the drum, a slide associated with said spindle and carried therewith about said radial axis, a spring pressing the slide towards the axis of the drum, a plunger revolving with said spindle about the drum but in fixed position with respect to said radial axis, a cam on the drum adapted to reciprocate said plunger, the cam being so located as to reciprocate the plunger at a time when the plunger is in line with said slide, and connections between the slide and the spindle for oscillating the spindle about its longitudinal axis when the slide is reciprocated.

15. Apparatus in accordance with claim 14, and having a blow mold and a spot mold, and means to revolve them about the central drum with the glass-carrying spindle and means to apply them successively to glass on the spindle.

In testimony whereof, I have hereunto signed my name to this specification.

ALVAH C. PARKER.